United States Patent [19]

Miceli

[11] 4,263,953
[45] Apr. 28, 1981

[54] SELF-LUBRICATING PNEUMATIC INSERT FOR A PNEUMATIC TIRE

[75] Inventor: Angelo S. Miceli, Norris, Tenn.

[73] Assignee: Uniroyal, Inc., New York, N.Y.

[21] Appl. No.: 3,672

[22] Filed: Jan. 15, 1979

[51] Int. Cl.³ .................... B60C 17/04; B60C 15/02
[52] U.S. Cl. .................... 152/158; 152/330 RF; 152/330 L; 152/340; 152/400
[58] Field of Search ............ 152/158, 330 RF, 330 L, 152/331, 339, 340, 341, 342, 400, 401

[56] References Cited

U.S. PATENT DOCUMENTS

| | | | |
|---|---|---|---|
| 1,399,575 | 12/1921 | Privett | 152/346 |
| 2,674,291 | 4/1954 | Campbell | 152/341 |
| 2,987,093 | 6/1961 | Urbon | 152/340 |
| 3,485,283 | 12/1969 | Brehmer et al. | 152/158 |
| 3,850,217 | 11/1974 | Edwards et al. | 152/330 RF |
| 3,850,220 | 11/1974 | Edwards et al. | 152/330 RF X |
| 3,935,892 | 2/1976 | Arimura et al. | 152/330 RF |
| 3,942,573 | 3/1976 | Lawrence et al. | 152/330 L |
| 3,945,419 | 3/1976 | Kosanke | 152/330 RF X |
| 3,993,114 | 11/1976 | Hinderks | 152/340 |
| 4,003,419 | 1/1977 | Verdier | 152/330 L X |
| 4,046,182 | 9/1977 | Farnsworth | 152/158 X |
| 4,091,854 | 5/1978 | French et al. | 152/158 |

FOREIGN PATENT DOCUMENTS

| | | | |
|---|---|---|---|
| 2414588 | 10/1975 | Fed. Rep. of Germany | 152/158 |
| 2438633 | 3/1976 | Fed. Rep. of Germany | 152/158 |
| 1135637 | 5/1957 | France | 152/340 |

*Primary Examiner*—John T. Goolkasian
*Assistant Examiner*—Lois E. Rodgers
*Attorney, Agent, or Firm*—Philip Rodman

[57] ABSTRACT

A pneumatic insert for a pneumatic tire comprises a generally toroidal-shaped hollow tubular member with beads, that includes an insert inflation chamber pneumatically noncommunicable with the tire inflation chamber. A crown portion of the insert has a radially inner and a radially outer layer that define a closed lubricant chamber, also noncommunicable with the tire inflation chamber under normal running conditions. Lubricant release means such as valve or diaphragm provided in the outer crown layer permit release of the lubricant when the tread collapses against the insert crown during run-flat conditions.

13 Claims, 9 Drawing Figures

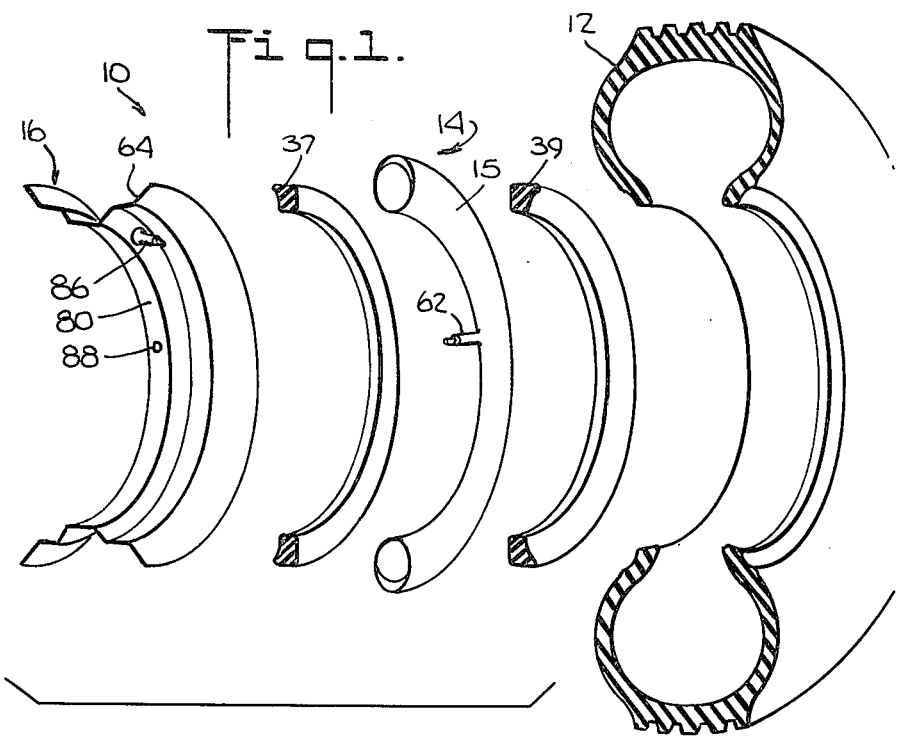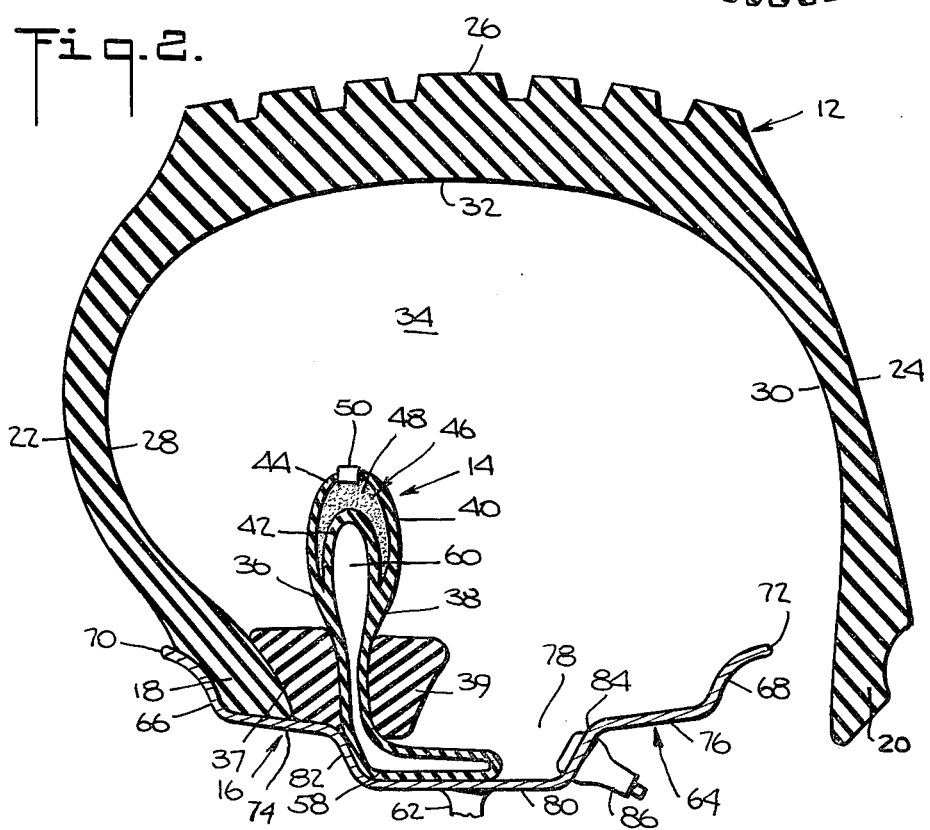

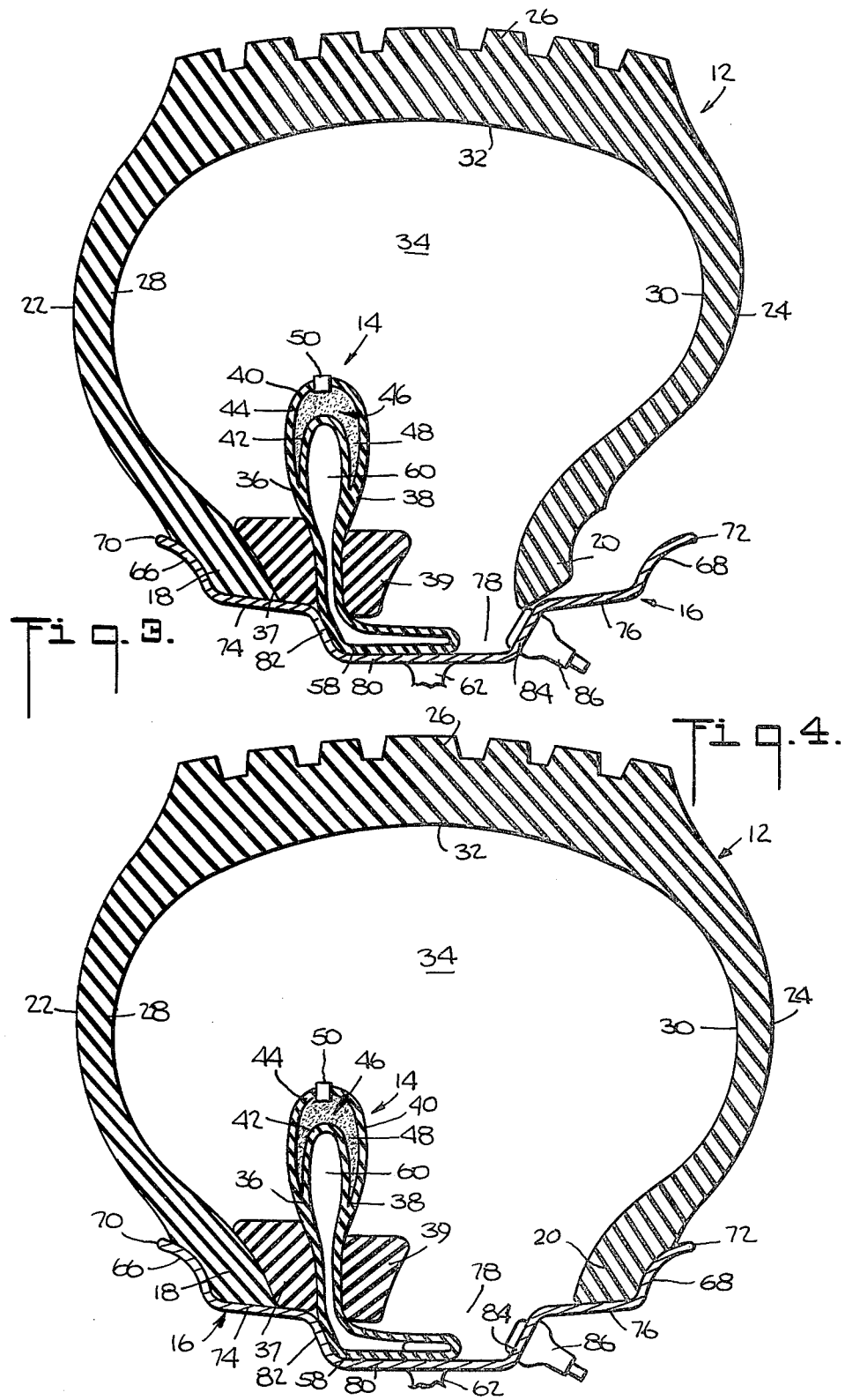

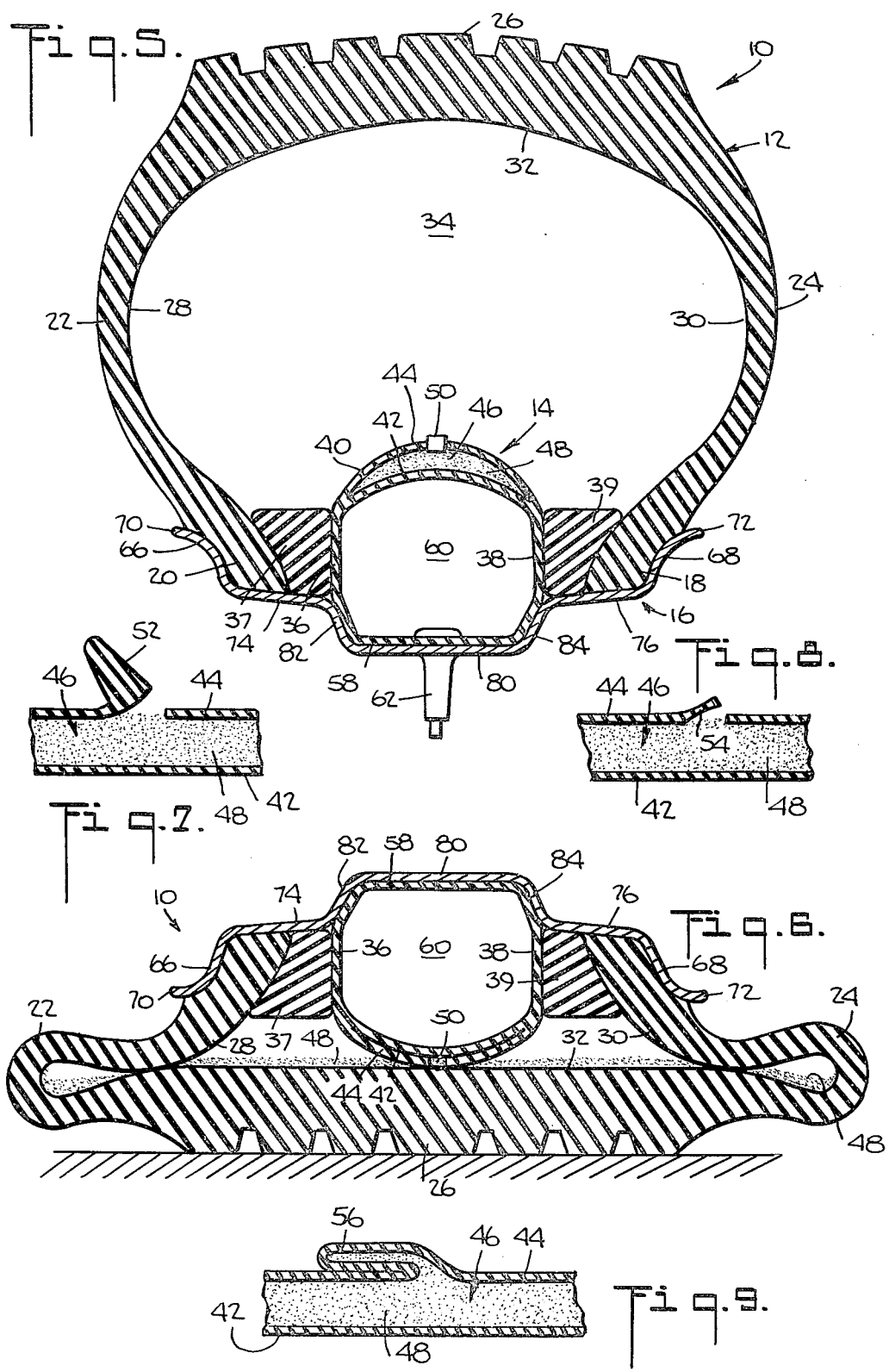

SELF-LUBRICATING PNEUMATIC INSERT FOR A PNEUMATIC TIRE

This invention is directed to pneumatic tires with run-flat capabilities and more particularly to a novel self-lubricating pneumatic insert for a pneumatic safety tire.

A continuing objective of the automobile industry is to eliminate the spare tire. To achieve this goal it is desirable and almost essential that a vehicle tire, even though totally deflated due to a puncture or other unexpected hazard, be capable of remaining in operation to transport the vehicle a distance of fifty miles at speeds of up to fifty miles per hour. Any such vehicular operation with a deflated tire is generally known as run-flat operation.

It is well known that there is a substantial heat buildup in an operating deflated tire due to tread and sidewall deformations. This heat buildup is excessively above and beyond that which is present in a tire used under normal operating conditions. It is also known that excess heat buildup can be reduced by providing supplementary interior support for the tire. Such support is usually provided in the tire inflation cavity with pneumatic or nonpneumatic type inserts, examples of which are disclosed in U.S. Pat. Nos. 2,987,093 and 3,485,283.

Pneumatic inserts in run flat tires generally have a smaller circumference than the interior tread surface of the tire to ensure that contact between the tire and the insert crown is avoided under normal operating conditions. However in a run-flat condition the tire tread, under a rated load, will collapse against the insert crown with frictional movement occurring between the contacting surfaces. This frictional movement not only contributes to heat buildup in the tire but can damage the pneumatic insert and intensify the damage to the tire.

It is thus desirable to limit the heat buildup due to such frictional movement between the tire and a pneumatic support insert.

Among the several objects of the present invention may be noted the provision of a novel safety tire incorporating a self-lubricating pneumatic insert, a novel self-lubricating pneumatic insert that maintains a lubricant in an enclosed chamber under normal running conditions and releases the lubricant under run-flat conditions, and a novel safety tire and rim assembly that incorporates a standard tire and a standard rim.

Other objects and features will be in part apparent and in part pointed out hereinafter.

The present invention relates to a novel safety tire and rim assembly incorporating a standard pneumatic tire and a separate self-lubricating pneumatic insert, both of which can be mounted on a standard rim.

The pneumatic insert, which is positioned within the tire cavity, is formed as a generally toroidal-shaped hollow tubular member defining an insert inflation chamber that is pneumatically noncommunicable with the tire inflation chamber. The insert includes a pair of sidewalls and a pair of axially spaced apart insert beads arranged to bear against the tire beads and the rim. The insert crown portion includes a radially inner layer and a radially outer layer that define a closed lubricant chamber between said layers. The lubricant chamber, under normal running conditions, is noncommunicable with the tire inflation chamber and the insert inflation chamber.

The radially outer layer of the lubricant chamber includes lubricant release means such as a valve or diaphragm. The lubricant release means are actuatable to permit release of the lubricant during run flat conditions. Such actuation is arranged to occur, for example, when the tire tread is collapsed against the insert crown causing depression of one or more release valves. If a diaphragm-type release means is used the actuation can occur due to rupture of the diaphragm by the insert pressure when the tire cavity pressure is lost.

Because the pneumatic insert is expected to maintain its inflation pressure under run-flat conditions a combination of the unopposed insert inflation pressure and the rolling contact zone between circumferential portions of the collapsed tread and the insert crown forces the lubricant outwardly of the valve or ruptured diaphragm. The expelled lubricant coats the insert crown and the interior surface of the tire thereby reducing heat buildup due to frictional contact between the collapsed tire tread and the insert crown. This reduction in heat buildup prolongs the life of the insert and the tire.

The invention accordingly comprises the constructions hereinafter described, the scope of the invention being indicated in the following claims.

In the accompanying drawings in which various possible embodiments of the invention are illustrated, FIG. 1 is a fragmentary exploded perspective view of a safety tire and rim assembly incorporating one embodiment of the present invention;

FIGS. 2–5 are sectional views showing a preferred sequence for mounting and assembling the tire and insert onto a rim;

FIG. 6 shows the safety tire and rim assembly after a tire failure; and

FIGS. 7–9 show further embodiments of the invention.

Corresponding reference numbers indicate corresponding parts throughout the several views of the drawing.

Referring to the drawings, especially FIGS. 1 and 5, a safety tire and rim assembly are generally indicated by reference number 10. The assembly 10 comprises a standard tubeless pneumatic tire 12 with a pneumatic insert member 14, both of which are mounted on a standard one piece drop-center rim 16.

The pneumatic tire 12 includes spaced annular bead portions 18 and 20 with sidewalls 22 and 24 extending therefrom and a tread portion 26 bridging the sidewalls. Respective inner surfaces 28, 30 and 32 of the sidewalls 22, 24 and the tread 26 define a tire cavity 34.

The pneumatic insert member 14 comprises a generally toroidal-shaped hollow tubular rubber body 15 having a pair of sidewalls 36 and 38. A pair of annular insert beads 37 and 39 are respectively joined to the sidewalls 36 and 38 in any suitable known manner. An insert crown portion 40 comprises annular inner and outer layers 42 and 44 bridging the insert sidewalls 36 and 38. The inner and outer layers 42 and 44 define the surroundings of a closed chamber 46 filled with a suitable known lubricant 48 such as disclosed in U.S. Pat. Nos. 2,987,093 or 4,003,419.

The lubricant 48 can be injected into the chamber 46 and the injection point patched or otherwise sealed.

The insert rubber can be fabric reinforced, if desired, and either or both layers 42 and 44 of the insert crown can be provided with a suitable tear resistant reinforcement (not shown).

One or more lubricant release means such as the valve member 50 are distributed along the circumference of the outer crown layer 44. The valve member 50 is of any suitable known structure that permits expulsion of lubricant upon depression or deflection during run-flat conditions when the tread 26 collapses against the insert 14 as shown in FIG. 6. For example, the valve 50 can be formed as a stud-like rubber projection 52 (FIG. 7) that breaks away from the outer crown layer 44 when deflected under rated load by the collapsed tread surface 32.

The lubricant release means can also be formed as one or more small diaphragms or areas of weakness 54 (FIG. 8) along the circumference of the outer crown layer 44. The diaphragm 54 can be of a predetermined strength to permit failure or rupture under run-flat conditions. Another type of lubricant release means is a hollow rubber appendage 56 (FIG. 9) that communicates with the lubricant chamber 48 and ruptures under run flat-conditions.

The pneumatic insert member 14 also includes a base portion 58 that, along with the sidewalls 36 and 38 and the inner crown layer 42, define an insert inflation chamber 60 that is noncommunicable with the lubricant chamber 46 and the tire cavity 34. A conventional inflation valve 62 is joined to the insert base portion 58 in a known manner.

The rim 16 comprises an annular tire retaining shell 64 having side flanges 66 and 68 with lip end portions 70 and 72. The shell 64 further includes respective bead support surfaces 74 and 76 spaced by a well portion 78. The well portion 78 has a base 80 and sloping sidewalls 82 and 84 that extend from the base 80 to the bead support surfaces 74 and 76. A standard tire valve 86 is provided in the well sidewall 84 and an insert valve opening 88 (FIG. 1) is provided in the base 80.

During mounting and inflating of the assembly 10 the tire beads and insert beads 18, 20, 37 and 39 can be lubricated with soap commonly available in any tire shop. Any suitable known tire mounting machine can be used for assistance in mounting the tire 12 and the pneumatic insert 14.

The tire bead 18 is mounted on the rim 16 by movement over the lip 72 of the rim flange 68. The insert 14 is deflated and its base portion 58 tucked between the insert sidewalls 38 and 40 to facilitate mounting of the insert bead 37 over the lip 72 of the rim flange 68. The insert 14 is then shifted along the bead support surface 76 toward the well portion 78 to permit mounting of the insert bead 39 over the lip 72 of the rim flange 68 and disposition of the insert valve 62 in the insert valve opening 88. The tire bead 20 is then mounted over the lip 72 of the rim flange 68 (FIG. 3).

Air is blown into the tire valve 86 to inflate and pressurize the tire cavity 34 which urges the beads 18 and 20 into position against the respective flanges 66 and 68. Next, the insert valve 50 is inflated and pressurized causing the insert beads 37 and 39 to bear against the respective tire beads 18 and 20. Preferably the engaging surfaces of the contacting insert beads and tire beads are of complementary shape.

Since the insert inflation chamber 60 and the tire cavity 34 do not communicate different pressure levels can be maintained in each space. Preferably the insert inflation pressure level exceeds the tire inflation pressure level.

When the safety tire and wheel assembly 10 is punctured or otherwise becomes substantially deflated during operation under a rated load, the tire tread 26 will collapse against the crown portion 40 of the insert as shown in FIG. 6. Due to the difference between the circumference of the interior tread surface 32 of the tire and the circumference of the outer layer 44 of the insert crown the rolling engagement of the tread surface 32 against the outer crown layer 44 causes the tire 12 to rub against the pneumatic insert 14. Consequently there is a temperature rise in both the tire 12 and the pneumatic insert 14.

As the safety tire and rim assembly 10 continues to operate in a run-flat condition, the lubricant release means is actuated at the area of contact between the interior tread surface 32 and the outer crown layer 44 of the insert 14. For example, the interior tread surface 32, during contact with the outer crown layer 44, will break the rubber studs 54 or burst the rubber appendage 56 to permit expulsion of the lubricant 48 from the lubricant chamber 46.

When the diaphragm 54 is used and a tire deflation occurs the pressure in the insert chamber 60 is unopposed by any pressure in the tire cavity 34. This condition of reduced or atmospheric pressure in the tire cavity 34 will enable the pressure in the insert chamber 60 to rupture the diaphragms or weakened portions 54. A combination of the unopposed insert chamber pressure and the contact between the collapsed tread surface 32 and the insert crown 40 will force the lubricant 48 outwardly from the lubricant chamber 46.

The expelled lubricant 48 coats the surface of the insert 14 and the interior tread surface 32 and reduces the frictional heat buildup between the two surfaces under run-flat conditions. The useful lives of the tire 12 and the insert 14 are thus prolonged.

As will be apparent to those skilled in the art the insert beads 37 and 39 can be formed separately of the insert body 15 and joined to the insert sidewalls in any suitable known manner. After a run-flat condition has occurred the failed, broken or ruptured lubricant release means such as the stud-like rubber projections 52, the areas of weakness 54 or the appendages 56 might feasibly be replaced by patches containing like components for reuse.

Some advantages of the present invention evident from the foregoing description include a safety tire and wheel assembly that incorporates a self-lubricating pneumatic insert, a standard tire and a standard rim. The standard rim is modified only to include an extra valve opening. The tire component is separable from the pneumatic insert component and each component can be mounted using standard mounting equipment. Since the tire and insert are separate components replacement of one does not necessarily require replacement of the other.

As various changes could be made in the above constructions without departing from the scope of the invention, it is intended that all matter contained in the above description or shown in the accompanying drawings shall be interpreted as illustrative and not in a limiting sense.

In view of the above, it will be seen that the several objects of the invention are achieved and other advantageous results attained.

What is claimed is:

1. A pneumatic insert for a pneumatic tire wherein the tire and insert are arranged to be supported on a wheel rim having an axis and an annular support surface, said insert comprising a generally toroidal-shaped hollow tubular member having a pair of sidewalls and a pair of annular insert beads, each said insert bead being joined to a respective said insert sidewall and being axially spaced apart a predetermined amount on said support surface, said insert sidewalls having radially outward and radially inward extremities with respect to said support surface, an insert crown portion joined to the radially outward extremities of said insert sidewalls and an insert base portion joined to the radially inward extremities of said insert sidewalls, said insert crown portion including a radially inner layer and a radially outer layer with respect to said axis, defining a first closed insert chamber between said radially inner and said radially outer layers, said radially inner layer, said insert sidewalls and said insert base portion defining a second closed insert chamber noncommunicable with said first closed insert chamber and inflatable to a first predetermined inflation pressure, wherein said insert sidewalls are capable of being collapsed against each other and said base portion when the second chamber of said insert member is deflated to facilitate mounting of said insert member, lubricating means disposed in said first closed chamber, and lubricant release means provided at a predetermined portion of the outer layer of said crown portion to permit release of said lubricating means from said first chamber at said predetermined portion of the insert crown when said lubricant release means are subjected to a predetermined actuation.

2. A pneumatic insert as claimed in claim 1 wherein valve means for inflating said second insert chamber are joined to the base portion of said insert.

3. A pneumatic insert as claimed in claim 1 wherein the radially inner and radially outer layers of said insert crown portion extend around the circumference of said insert member whereby said first closed insert chamber is of toroidal configuration.

4. A pneumatic insert as claimed in claim 3 wherein said lubricant release means comprise at least one valve member on said radially outer layer.

5. A pneumatic insert as claimed in claim 4 wherein said valve member comprises a stud member projecting from said radially outer layer, the junction between said stud member and said outer layer being breakable to permit expulsion of said lubricating means from said first closed insert chamber through said breakable junction.

6. A pneumatic insert as claimed in claim 4 wherein said valve member comprises a hollow sealed appendage joined to and projecting from said radially outer layer, said appendage being rupturable to permit expulsion of said lubricating means from said first closed insert chamber through said appendage.

7. A pneumatic insert as claimed in claim 4 wherein said valve member comprises a predetermined zone of predetermined weakness at said predetermined portion of said radially outer layer, said weak zone being rupturable under run-flat conditions of said tire to permit expulsion of said lubricating means from said first closed insert chamber through said rupturable weak zone.

8. In combination with a pneumatic tire and a wheel rim upon which the tire is supported said wheel rim having an axis and an annular support surface extending laterally in the direction of the axis of the wheel rim and a pair of axially spaced apart annular flanges joined to and extending radially outward from said support surface, said tire having a pair of axially spaced apart annular beads each in engagement with one of said flanges and the support surface with a pair of sidewalls each joined to and extending generally radially outward from the beads, and a tread joined to the radially outward ends of the sidewalls, said tread and sidewalls having inner surfaces that with said wheel rim support surface form a closed toroidal tire cavity, a generally toroidal shaped hollow tubular insert member disposed within said tire cavity whereby a tire inflation chamber is defined between said tire and said insert member, said insert member having a pair of axially spaced apart annular insert beads respectively arranged to bear against respective said tire beads, a pair of insert sidewalls spaced from said tire sidewalls, said insert sidewalls having radially outward and radially inward extremities with respect to said support surface, an insert crown portion joined to the radially outward extremities of said insert sidewalls and an insert base portion joined to the radially inward extremities of said insert sidewalls, said insert crown portion including a radially inner layer and a radially outer layer with respect to said axis, defining a first closed insert chamber between said radially inner and said radially outer layers, said radially inner layer, said insert sidewalls and said insert base portion defining a second closed insert chamber noncommunicable with said first closed insert chamber and said tire inflation chamber and inflatable to a first predetermined inflation pressure, wherein said insert sidewalls are capable of being collapsed against each other and said base portion when the second chamber of said insert member is deflated to facilitate mounting of said insert member, lubricating means disposed in said first closed chamber, and lubricant release means provided in said outer layer of said crown portion for permitting release of said lubricating means from said first chamber when said lubricant release means are subjected to a predetermined actuation said insert crown portion being normally spaced from the inner tread surface of said tire when said tire inflation chamber is inflated to a second predetermined pressure and said insert inflation chamber is inflated to said first predetermined pressure.

9. The combination of claim 8 wherein the surface of said annular insert beads that bear against the respective tire beads have a cross-sectional shape that substantially conforms to the cross-sectional shape of the tire beads.

10. The combination of claim 8 wherein valve means for inflating said insert chamber are joined to the base portion of said insert.

11. The combination of claim 8 wherein valve means for inflating the tire inflation chamber are located in the annular support surface of said wheel.

12. The combination of claim 8 wherein the crown portion of said insert extends radially beyond the annular flanges of said rim and is inflatable to a predetermined pressure sufficient to maintain said tire tread beyond the support surface of said rim when said tire cavity is deflated and said tire is supporting a rated load.

13. The combination of claim 8 wherein said tire tread is collapsible against said insert when said tire cavity is deflated and said tire is supporting a rated load, said insert being capable of supporting said collapsed tire tread beyond the support surface of said rim when said first closed insert chamber is at a first predetermined inflation pressure, said lubricant release means including a plurality of valve members circumferentially spaced on said radially outer layer and actuatable by said tire tread to permit release of said lubricating means when said tire tread is collapsed against said insert.

* * * * *